(12) United States Patent
Jhin et al.

(10) Patent No.: US 9,220,664 B1
(45) Date of Patent: Dec. 29, 2015

(54) METHOD OF ADMINISTRATION OF FRAGRANCE AND/OR SCENT AND PATCH THEREFOR

(71) Applicant: SURGAWI INVESTMENTS LIMITED, Tortola (VG)

(72) Inventors: Jaclyn Jhin, Hong Kong (HK); Hanafi Tanojo, Sunnyvale, CA (US)

(73) Assignee: Surgawi Investments Limited, Tortola (VG)

( * ) Notice: Subject to any disclaimer, the term of this patent is extended or adjusted under 35 U.S.C. 154(b) by 23 days.

(21) Appl. No.: 14/058,223

(22) Filed: Oct. 19, 2013

(51) Int. Cl.
*B32B 7/12* (2006.01)
*A61K 8/02* (2006.01)
*B32B 37/14* (2006.01)

(52) U.S. Cl.
CPC ............ *A61K 8/0208* (2013.01); *B32B 7/12* (2013.01); *B32B 37/14* (2013.01); *Y10T 428/14* (2015.01); *Y10T 428/1438* (2015.01); *Y10T 428/1471* (2015.01)

(58) Field of Classification Search
CPC .......... C09J 7/0267; C09J 7/045; C09J 7/048; G09F 3/10; A45D 34/00; A45D 29/001; A61F 13/2051; A61F 13/8405; A61F 13/20; A61L 9/12; A61L 15/26; A61L 15/44; B32B 27/18; B32B 27/065; B32B 7/06; C08F 299/06; C08L 75/04; Y10T 428/14; Y10T 428/1405; Y10T 428/1438; Y10T 428/1471; Y10T 428/1481; Y10T 428/1486
See application file for complete search history.

(56) References Cited

U.S. PATENT DOCUMENTS

| | | | | |
|---|---|---|---|---|
| 4,145,001 | A * | 3/1979 | Weyenberg et al. | 239/56 |
| 4,283,011 | A * | 8/1981 | Spector | 239/36 |
| 4,880,690 | A | 11/1989 | Szycher et al. | |
| 5,136,640 | A * | 8/1992 | Kim | 379/452 |
| 5,395,047 | A * | 3/1995 | Pendergrass, Jr. | 239/56 |
| 5,637,401 | A * | 6/1997 | Berman et al. | 516/111 |
| 6,723,671 | B2 | 4/2004 | Zolotarsky et al. | |
| 8,277,940 | B2 | 10/2012 | Desiderio et al. | |
| 2002/0151236 | A1* | 10/2002 | Zolotarsky et al. | 442/96 |
| 2002/0157983 | A1* | 10/2002 | Krupka et al. | 206/466 |
| 2005/0196571 | A1* | 9/2005 | Penny et al. | 428/40.1 |
| 2009/0081912 | A1 | 3/2009 | Burrow et al. | |
| 2012/0263905 | A1* | 10/2012 | Park | 428/41.8 |

FOREIGN PATENT DOCUMENTS

| | | | |
|---|---|---|---|
| EP | 525530 | A2 * | 2/1993 |
| EP | 2039371 | A1 | 3/2009 |
| EP | 2039373 | A1 | 3/2009 |
| GB | 2407756 | A * | 5/2005 |

* cited by examiner

*Primary Examiner* — Patricia L Nordmeyer
(74) *Attorney, Agent, or Firm* — Singularity LLP

(57) ABSTRACT

A patch facilitates transportation, application, and emission of fragrances for perfume wearers. A plurality of structural and adhesive layers provide a manufacturable patch with structural and functional integrity. The material selection, and perfume selection and concentration, provides efficacy of fragrance emission for a predetermined period.

19 Claims, 5 Drawing Sheets

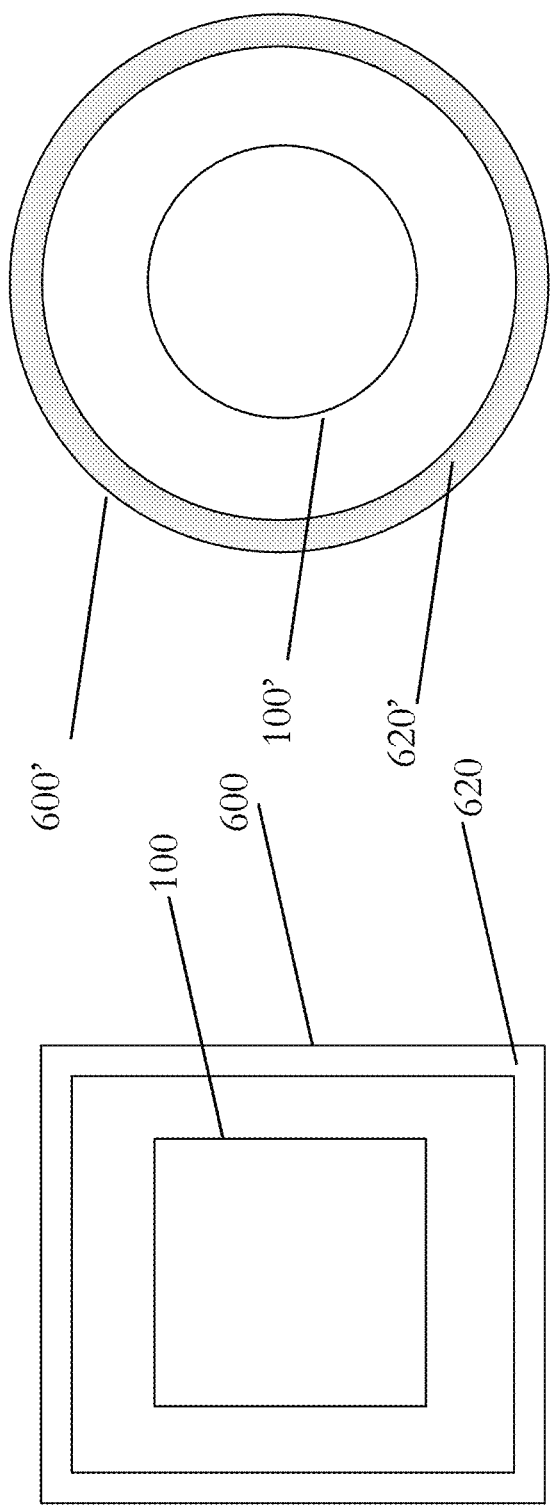

METHOD OF ADMINISTRATION OF FRAGRANCE AND/OR SCENT AND PATCH THEREFOR

FIELD OF THE INVENTION

The present invention relates to the administration and/or emission of fragrances and/or scents, and more particularly to methods and mechanisms for administering and/or emitting the fragrances and/or scents.

BACKGROUND

Convenience of application and reapplication of perfume, cologne, and the like has been a concern for consumers for some time. Limitations on liquid transportability during air travel have presented additional challenges.

Perspiration tends to accelerate dissipation of fragrance or scent from perfume or cologne which a user applies directly to the skin. Particularly, for example, after someone has engaged in intense exercise, mere spraying, dabbing, wiping, or other application of perfume or cologne can be ineffective because the person's perspiration washes away the perfume or cologne, requiring reapplication. The reapplication can be not only inconvenient but also expensive.

Perspiration also can affect a wearer's garments or undergarments, and make it more difficult to apply perfume effectively.

There have been various approaches to nonliquid application of perfume or cologne. Such approaches have fallen short in various ways, whether because of lack of efficacy (e.g. excessively rapid fragrance dissipation), lack of structural integrity (deterioration because of destructive chemical effect of fragrances on adhesives), or the like.

In view of the deficiencies of these prior approaches, it would be desirable to provide a more efficacious, deterioration-resistant application of fragrance.

BRIEF DESCRIPTION OF THE DRAWINGS

The foregoing and other aspects of various embodiments of the present invention will be apparent through examination of the following detailed description thereof in conjunction with the accompanying drawing figures in which similar reference numbers are used to indicate functionally similar elements.

FIGS. 7A and 7B show top view of patches inside packages according to embodiments.

DETAILED DESCRIPTION

Throughout the discussion herein, terms such as "fragrance" and "scent" are used collectively or interchangeably in some places. For ease of discussion, "fragrance" will apply to both fragrance and scent, and to other synonymous olfactory terms. Likewise, terms such as "perfume" and "cologne" are used interchangeably in some places. For ease of discussion, "perfume" will apply to both perfume and cologne, and to other synonymous terms for liquid or semiliquid media for fragrance administration or application, including but not limited to incense, oil, attar, cologne, balm, or sachet.

Also, some places in this description refer to garments, undergarments, or both, or may refer to clothing. For purposes of this description, including the claims, "clothing" may be used to apply to any of these items.

Additionally, the use of the terms "preferred" or "preferably" to describe types of materials or structural arrangements may refer to efficacy, efficiency, structural integrity, economy of manufacture, or the like.

Figure 1:
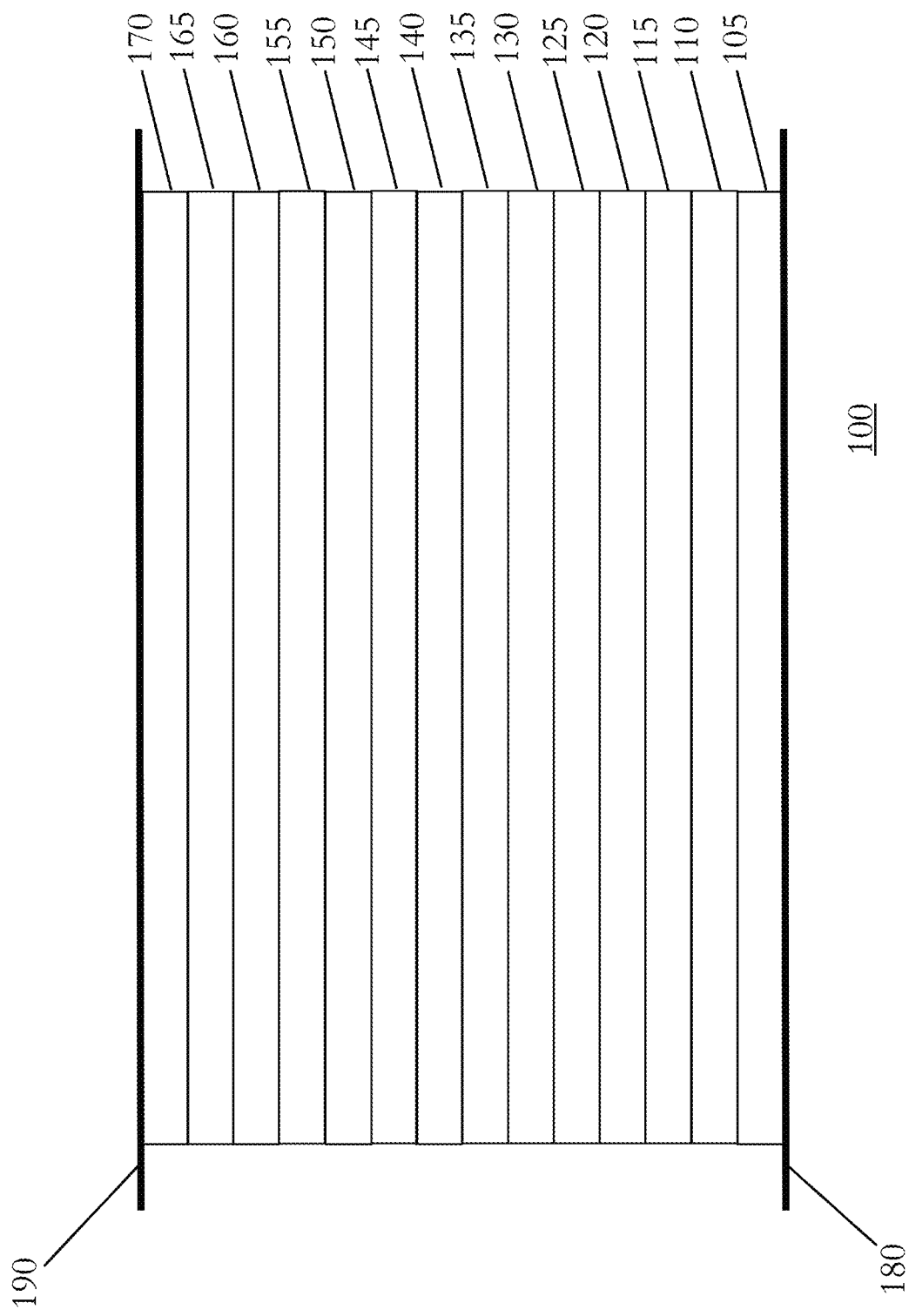
FIG. 1 is a side view of a patch according to an embodiment.

Referring now to FIG. 1, a patch 100 has a plurality of layers. All of the layers are shown here as having the same height or thickness, but in practical application such will not be the case. Layers will vary in thickness according to types of material and types of adhesive, among other things. In addition, for ease of view, the profile of the patch 100 in FIG. 1 is exaggerated, so that the layers are easier to observe. In practical application, the patch 100 will be much wider than it is tall. Finally, in FIG. 1 all of the layers are shown as having the same width or diameter, but this is not necessary in practical application.

In FIG. 1, backing layers 180 and 190, which may be made of any number of suitable materials, are provided above and below the layers of patch 100, both to preserve adhesive which adheres the patch to skin or garment/undergarment, and to preserve the fragrance. The backing layers 180 and 190 are shown as larger in profile than the patch 100. The difference in size can facilitate removal of the layers 180 and 190 for application of the patch 100. The amount of size difference between layers 180 and 190, on the one hand, and patch 100, on the other, is not significant to the invention.

In some embodiments, immediately above backing layer 180 is a first adhesive layer 105 which adheres the patch to skin or garment/undergarment. In one embodiment, first adhesive layer 105 may comprise or consist of any suitable adhesive which will adhere the patch comfortably and reasonably securely on skin, with reasonable ease of removal without discomfort. In another embodiment, first adhesive layer 105 may comprise or consist of any suitable adhesive which will adhere the patch reasonably securely to clothing material. Depending on the embodiment, and on the surface to which the patch is to be adhered, the adhesive may be acrylic or other derivative, or it may be a urethane prepolymer. It is desirable to be able to take the backing layer off easily, but also to have the adhesive stick easily, without leaving marks on the skin or garment.

In one implementation, the patch may be applied to the side of a garment or undergarment facing the skin. The garment or undergarment may be made of any number or combination of materials, including but not limited to natural materials such as cottons, wools, and silks, artificial materials such as polyesters, rayons, orlons, and nylons, and varying combinations of natural and artificial materials. The first adhesive layer 105 may be matched to the material of the garment or undergarment for better hold.

In some embodiments, above the adhesive layer 105 is a first structural layer 110, which in one embodiment may be polyester or other artificial material, to provide structural integrity to the patch 100. In some embodiments, the adhesive layer 105 and structural layer 110 may be omitted, and the backing layer 180 can be polyester.

Above that layer 110 (or, in embodiments where layers 105 and 110 are omitted, above backing sheet 180) is a second or further adhesive layer 115, which in one embodiment may be an acrylic or other derivative. Above that layer is a second or further structural layer 120, which in one embodiment may be cellulose, also to provide structural integrity. Acrylic adhesive is preferred for joining the layers 110 and 120, though other adhesives also may be suitable. Where adhesive layer 105 and structural layer 110 are omitted, the adhesive layer 115 may have the same characteristics as adhesive layer 105, since its purpose is both to hold the backing layer 180 until removal, and to adhere the patch 100 suitably to skin or clothing.

Next is a third or further adhesive layer 125, which in one embodiment may be a urethane prepolymer adhesive. In some embodiments, instead of adhesive layers 115 and 125, the structural layer 120 may be in the form of a double-sided tape.

Above adhesive layer 125 (or, in the case of the double-sided tape embodiments, above structural layer 120) is a third or further structural layer 130, which in one embodiment may be a woven fabric layer, to provide structural integrity, and also to provide breathability and absorbency according to certain embodiments. The fibers in the woven fabric may be cotton, nylon, or other artificial or natural or artificial fiber. Urethane prepolymer adhesive is preferred for joining the layers 120 and 130, though other adhesives may be suitable, particularly depending on the type of fabric used in layer 130.

Looking further at FIG. 1, above layer 130 is a fourth or further structural layer 140, which in one embodiment may be a polyethylene resin film, though other plastics may be suitable, to provide impermeability, as a vapor or liquid barrier. In some embodiments there may be a fourth or further adhesive layer 135 between layers 130 and 140, but depending on the method of manufacture of the patch and patch layers, and on the material in layer 140, additional adhesive may not be necessary. Where used, layer 135 will be rubber adhesive in some embodiments.

Above layer 140 is a fifth or further adhesive layer 145, which in one embodiment may be a rubber adhesive. Above that is a fifth or further structural layer 150, functioning as a perfume retaining layer, to which perfume is applied during manufacture, which retains the perfume, and emits fragrance when the patch is in use. In one embodiment, the perfume retaining layer 150 is made of cotton scrim, though other absorbent and/or liquid-retentive materials may be suitable.

Above perfume retaining layer 150 is a sixth or further structural layer 160, which in one embodiment may comprise or consist of metallic foil such as aluminum, silver, or gold. This layer 160 may be in the shape of a ring that surrounds perfume retaining layer 150. Depending on the area of layer 160 relative to layer 150, there may be a sixth or further adhesive layer 155 between layers 150 and 160, or between layers 140 and 160. In the latter case, the perfume retaining layer 150 will be smaller in surface area than layer 140 or layer 160, so that layers 140 and 160 could come into contact with each other. In that event, fifth adhesive layer 145 could join layers 140 and 150, and sixth adhesive layer 155 could join layers 140 and 160. In some embodiments, adhesive layer 155 also could join layers 150 and 160.

Above layer or ring 160 is a seventh or further covering layer 170, which in one embodiment may comprise or consist of metallic foil such as aluminum, silver, or gold. Layers 160 and 170 may be made of the same materials, but such is not necessary. Layers 160 and 170 above, and the layers below, serve to facilitate perfume retention prior to use. In use, layer 170 may be removed to expose perfume retaining layer 150.

Suitable adhesives, not shown, may be provided on either or both sides of layer or ring 160, and on either or both sides of layer 170, to facilitate adhesion of layer 160 and 170; adhesion of layer 170 and backing layer 190; and removal of layer 170 immediately prior to use to facilitate exposure of perfume retaining layer 150 to air, thus enabling emission or emanation of fragrance. In one embodiment, layer 170 may be adhered to backing layer 190, and layer 170 may not be adhered, or may be minimally adhered, to ring 160, to facilitate removal of layer 170 with backing layer 190 when backing layer 190 is removed, thus facilitating exposure of the perfume retaining layer 150 in patch 100. In one embodiment, as shown in FIG. 1, adhesive layer 165 may be provided between layer or ring 160 and covering layer 170.

According to embodiments, as alluded to earlier, the perfume retaining layer 150 may have the same diameter as, or a larger diameter than an inner diameter of layer or ring 160. Ring 160 provides a space between layer 170 and the lower layers so that an upper layer of the perfume retaining layer 150 remains relatively untouched between patch manufacture and patch use. In addition, perfume retaining layer 150 may have the same diameter as the other layers. More area for perfume retaining layer 150 means more perfume that can be absorbed. As will be discussed herein, different perfume concentrations, and indeed different perfumes, will have different effects on duration of fragrance emission. Cost and efficacy considerations, among others, will affect selection of perfume, as well as size and composition of layer 150.

The intricacy of the foregoing structure addresses issues of integrity, flexibility, storage, and fragrance retention. Different perfumes can have different effects on adhesives and on materials in the patch 100. In particular, chemical composition of perfumes can break down the integrity of adhesives. Perfumes also can permeate materials in the various structural layers, and potentially can break down their integrity as well. The overall arrangement of layers described herein is believed to yield a patch which can be stored for a suitable length of time prior to sale or use, so that fragrance emission can continue over an appropriate length of time in use.

Figure 2A:
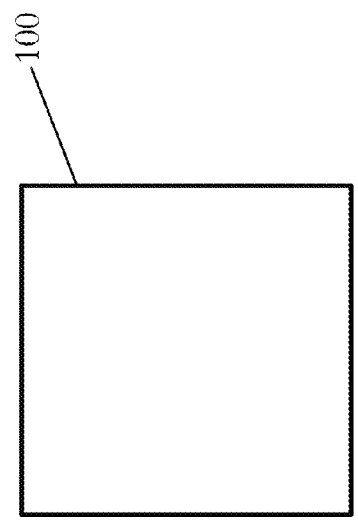
FIGS. 2A and 2B are top views of patches according to embodiments.
Figure 2B:
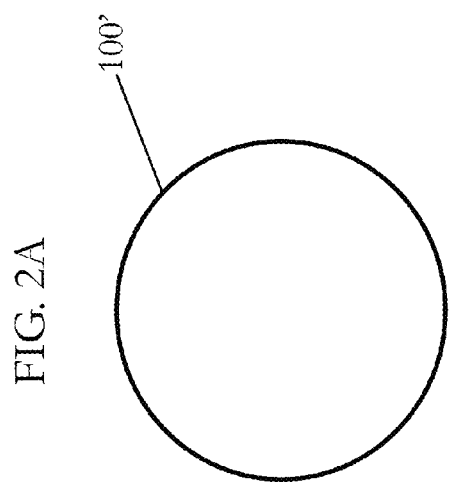
Figure 4A:
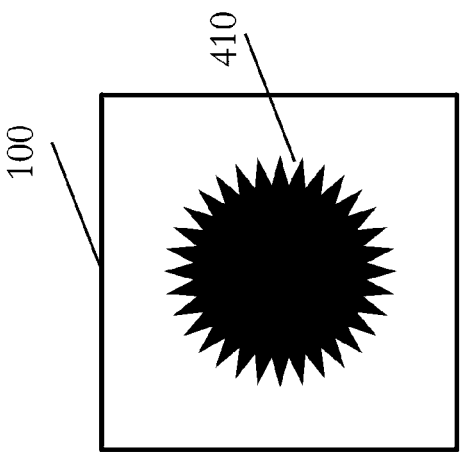
FIGS. 4A, 4B, and 4C show top views of patches according to an embodiment, depicting gradual fading of a pattern on a top layer.
Figure 5A:
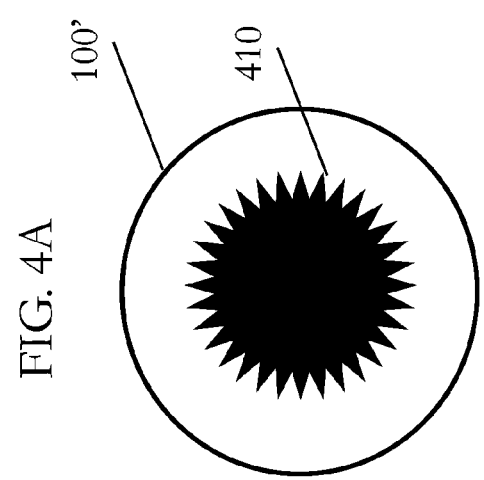
FIGS. 5A, 5B, and 5C show top views of patches according to an embodiment, depicting gradual fading of a pattern on a top layer.
Figure 4B:
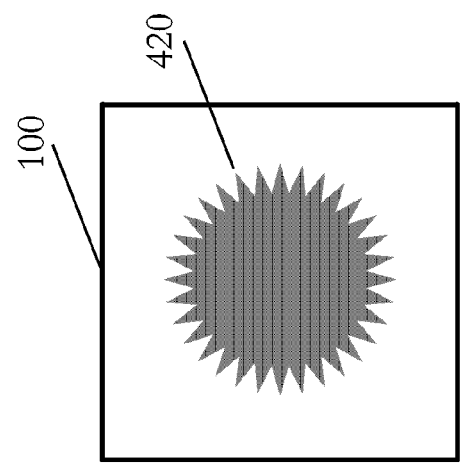
Figure 5B:
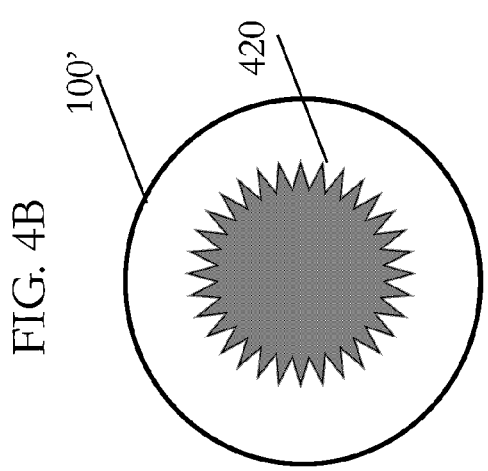
Figure 4C:
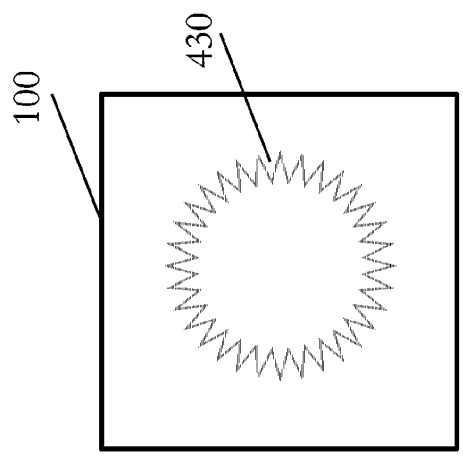
Figure 5C:
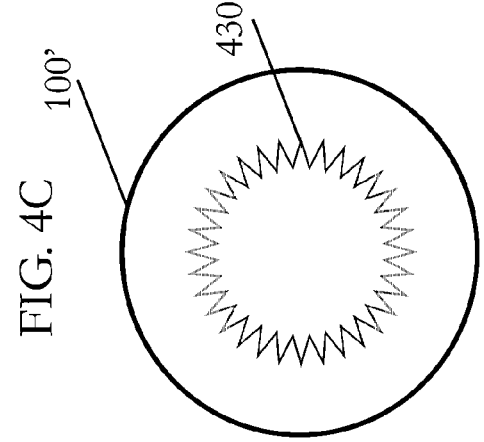

FIGS. 2A and 2B show a top view of patch 100, 100' according to embodiments. The shapes shown are squares and circles, for the sake of simplicity. It should be clear to ordinary skilled artisans that other shapes are possible. Aesthetic as well as manufacturing considerations may affect selection of patch shape. According to embodiments, patch 100, 100' may have a width or diameter of approximately one inch, or 2.5 cm, but other sizes may be desirable, depending for example, on ease of concealment of the patch, or available surface area of the garment or undergarment to which the patch is to be applied.

Figure 3A:
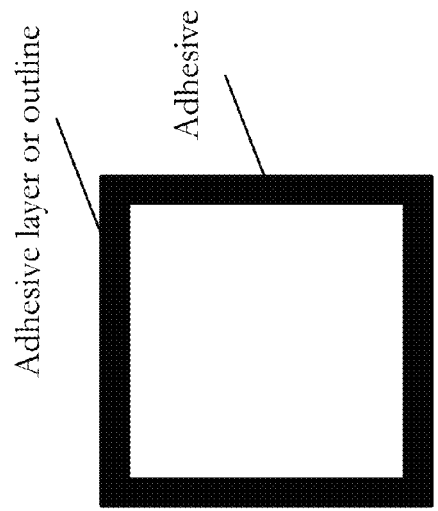
FIGS. 3A and 3B are top views of one of the patch layers according to embodiments.
Figure 3B:
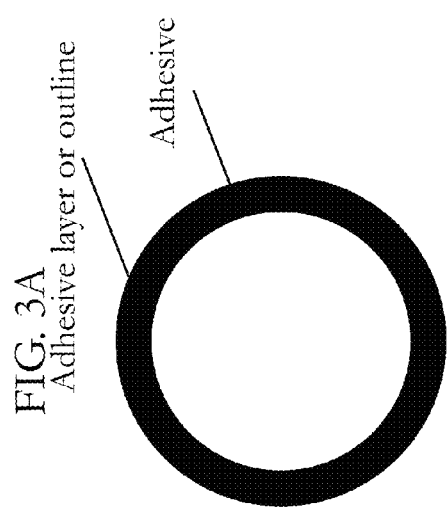

FIGS. 3A and 3B depict adhesive layers or portions according to some embodiments. As shown, adhesive layers or outlines comprise the adhesives. In come embodiments, the adhesive layers have the same area as other layers in the patch 100. In some embodiments, the adhesive layers extend around a perimeter of the patch, similarly to ring 160 in FIG. 1, leaving an opening in the middle so as to facilitate emanation of scent, for example. In some embodiments, chemical and physical/structural considerations may motivate the use of less adhesive, rather than more, so that the perfume in the patch is less able to break down the adhesive. Where an opening between layers is not necessary, the adhesive can extend across a larger area of the patch, to facilitate adhesion between layers, or adhesion of the patch to skin or garments/undergarments.

FIGS. 4A-4C and 5A-5C show a top view of patches according to embodiments, including a pattern 410 in FIGS.

4A and 5A with a color different from that of perfume retaining layer 150. The pattern 410 may be drawn or composed in an ink which fades as the fragrance dissipates, providing a visual indication in addition to an olfactory indication of reduced efficacy. As shown in the progression from FIGS. 4A to 4C and FIGS. 5A to 5C, in use the ink may fade to lighter pattern 420 in FIGS. 4B and 5B as the fragrance dissipates, and may disappear completely in FIGS. 4C and 5C (though shown in outline form 430) when the patch is finished emitting scent, or when the efficacy of the scent drops below a predetermined amount. The fading provides a visual indication to the wearer so that the wearer may determine whether and when to remove the patch and/or substitute a new patch.

While FIGS. 4A-4C and 5A-5C show a pattern which fades, the perfume retaining layer 150 may itself be colored, and may fade as the scent dissipates. In addition, the pattern in these Figures is exemplary. While the Figures show a multi-pointed star-shaped figure, other patterns, or other elements, such as a logo, or a product name, may be used.

Structural layer material selection, fragrance concentration, and overall delivery mechanism, including configuration and arrangement of layers, should be selected and configured to allow effective emanation of fragrance for approximately four hours, according to one embodiment. Longer or shorter periods of efficacy may be desirable. One or more of the just-mentioned parameters may be varied to allow for the varied periods of time. Different parameter combinations may yield the same duration of efficacy. In some embodiments, the amount of permeated material in the perfume retaining layer 150 that is exposed to air may be varied.

Ordinarily skilled artisans will be familiar with different classifications of fragrances. These classifications, and categories within those classifications, are too numerous to set forth here. The invention is not limited by a particular fragrance. A non-exhaustive list of some of the better-known classifications and categories may include woody, floral, citrus/fruity, tropical, spicy, musk, fougere, chypre, jasmine, vanilla, oriental, and leathery.

Figure 6:
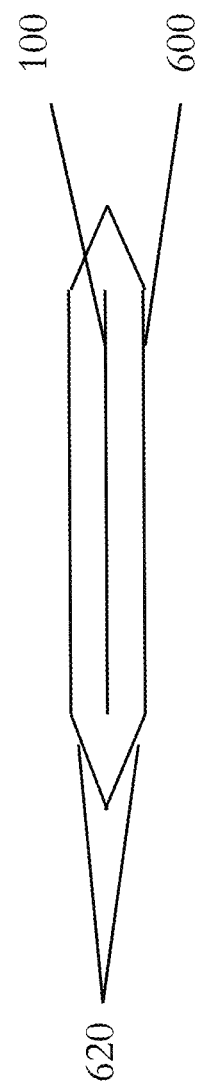
FIG. 6 shows a side view of a patch inside a package, according to an embodiment.

FIG. 6 shows a side view of a patch 100 inside a package or container 600, according to one embodiment. The diagonal lines in the Figure depict crimping 620 or other suitable closure to the package 600 in order to keep the patch 100 fresh and hold in the fragrance so that the patch does not lose its efficacy prior to sale or use. As a practical matter, of course, no seal is perfect, but when a number of such packages are held inside a further container, as might for example facilitate carrying a number of such packages, efficacy can be prolonged.

FIGS. 7A and 7B show a top view of different packaging 600, 600' for patch 100, 100', corresponding to the side view in FIG. 6. FIGS. 7A and 7B also show crimping or other suitable closure 620, 620' for the packaging. In some embodiments, the packaging may include aluminum foil, aluminum plastic foil, clear plastic foil, or some combination of these.

The foregoing description sets forth, in various embodiments, arrangements of adhesive and structural layers. It is within the contemplation of the invention, as may be bounded by prior art, to omit one or more of the adhesive and/or structural layers.

In addition, the foregoing description sets forth structure for numerous embodiments of a fragrance-emitting patch in accordance with various aspects of the invention. The invention also pertains to the manufacture of such embodiments. With the knowledge of materials selection as set forth in this description, ordinarily skilled artisans will be able to assemble the various layers.

While the invention has been described in detail above with reference to numerous embodiments, variations within the scope and spirit of the invention will be apparent to those of ordinary skill in the art. Thus, the invention should be considered as limited only by the scope of the appended claims.

What is claimed is:

1. A fragrance-emitting patch comprising:
    a first layer (110, 180);
    a second, adhesive layer (115) on one side of the first layer;
    a third, structural layer (120) on an opposite side of the second, adhesive layer from the first layer;
    a fourth, adhesive layer (125) on an opposite side of the third, structural layer from the second, adhesive layer;
    a fifth layer (140) on an opposite side of the fourth, adhesive layer from the third, structural layer, said fifth layer being substantially impermeable to vapor or liquid;
    a sixth, adhesive layer (145) on an opposite side of the fifth layer from the fourth adhesive layer;
    a seventh, perfume retaining layer (150) on an opposite side of the sixth, adhesive layer from the fifth layer;
    a an eighth, structural layer (160) on an opposite side of the seventh, perfume retaining layer from the sixth, adhesive layer; and
    a ninth layer (170) on an opposite side of the eighth, structural layer from the seventh, perfume retaining layer, wherein the eighth, structural layer provides spacing between the seventh, perfume retaining layer and the ninth layer.

2. A patch as claimed in claim 1, wherein the first layer comprises a first backing layer covering the second, adhesive layer, and wherein the second, adhesive layer adheres the patch to a wearer's skin or clothing.

3. A patch as claimed in claim 1, further comprising a substance, disposed on the seventh, perfume retaining layer, that fades as the fragrance emanates, to provide a visual indication of fragrance remaining in the patch.

4. A patch as claimed in claim 3, wherein the substance disappears when the amount of fragrance that the patch emanates drops below a predetermined concentration.

5. A patch as claimed in claim 4, wherein the substance comprises a fadable ink.

6. A patch as claimed in claim 1, further comprising:
    a further structural layer (130) on an opposite side of the second, adhesive layer from the third, structural layer; and
    a further adhesive layer (135) between the further and fifth layers.

7. A patch as claimed in claim 6, wherein the further structural layer comprises a woven fabric.

8. A patch as claimed in claim 7, wherein the woven fabric comprises a material selected from the group consisting of cotton, nylon, natural material, and synthetic material.

9. A patch as claimed in claim 1, further comprising:
    a further adhesive layer (155) between the seventh, perfume retaining layer and eighth, structural layer; and
    a still further adhesive layer (165) on an opposite side of the eighth, structural layer from the sixth, adhesive layer.

10. A patch as claimed in claim 1, further comprising a package for containing the patch and substantially retaining the fragrance until the patch is ready for use.

11. A patch as claimed in claim 1, wherein the first layer comprises polyester.

12. A patch as claimed in claim 1, wherein the second, structural layer comprises cellulose.

13. A patch as claimed in claim 1, wherein the fifth layer comprises a plastic film.

14. A patch as claimed in claim 13, wherein the plastic film comprises a substantially vapor impermeable material.

15. A patch as claimed in claim 14, wherein the plastic film comprises polyethylene.

16. A patch as claimed in claim 1, wherein the seventh, perfume retaining layer comprises a perfume-absorbent material such as cotton.

17. A patch as claimed in claim 1, wherein the eighth structural layer comprises metallic foil.

18. A patch as claimed in claim 1, wherein the eighth structural layer comprises a ring.

19. A patch as claimed in claim 1, wherein the ninth layer comprises metallic foil, as part of a second backing layer to which the ninth layer is adhered, and wherein the ninth layer is removed when the second backing layer is removed, so as to expose the seventh, perfume retaining layer.

\* \* \* \* \*